US009652956B2

(12) United States Patent
Falkenberg et al.

(10) Patent No.: US 9,652,956 B2
(45) Date of Patent: May 16, 2017

(54) THEFT-PREVENTING SYSTEM AND METHOD WITH MAGNETIC FIELD DETECTION

(71) Applicant: Alert Systems ApS, Horsholm (DK)

(72) Inventors: Verner Falkenberg, Copenhagen S (DK); Dennis Pedersen, Aarhus C (DK)

(73) Assignee: Alert Systems ApS, Horsholm (DK)

( * ) Notice: Subject to any disclaimer, the term of this patent is extended or adjusted under 35 U.S.C. 154(b) by 0 days.

(21) Appl. No.: 14/891,223

(22) PCT Filed: May 13, 2014

(86) PCT No.: PCT/EP2014/059769
§ 371 (c)(1),
(2) Date: Nov. 13, 2015

(87) PCT Pub. No.: WO2014/184192
PCT Pub. Date: Nov. 20, 2014

(65) Prior Publication Data
US 2016/0093183 A1 Mar. 31, 2016

(30) Foreign Application Priority Data
May 14, 2013 (DK) ................................ 2013 70261

(51) Int. Cl.
*G08B 13/24* (2006.01)
*G05B 23/02* (2006.01)
*G08B 29/18* (2006.01)

(52) U.S. Cl.
CPC ......... *G08B 13/248* (2013.01); *G08B 29/185* (2013.01)

(58) Field of Classification Search
CPC combination set(s) only.
See application file for complete search history.

(56) References Cited

U.S. PATENT DOCUMENTS 3,971,983 A 7/1976 Jaquet
6,539,327 B1 3/2003 Dassot et al.

FOREIGN PATENT DOCUMENTS

CN 101401134 A 4/2009
CN 102884558 A 1/2013
(Continued)

OTHER PUBLICATIONS

Search Report for Chinese Application 201480028323X, received Sep. 29, 2016.
(Continued)

*Primary Examiner* — Brian Zimmerman
*Assistant Examiner* — Cal Eustaquio
(74) *Attorney, Agent, or Firm* — Brinks Gilson & Lione

(57) ABSTRACT

A tag-based electronic theft-preventing system further comprises a first and second multi-axis magnetometer arranged at the two sides of an entrance to a shopping area and configured to output a first and second vector signal representing movement of a first and second magnetic field vector, respectively. A signal processor estimates a first rotation of the first magnetic field vector and a second rotation of the second magnetic field vector, and generates an indicator signal comprising indication of a counter-direction rotation or a same-direction rotation. The system computes therefrom if an unlock magnet for an anti-shoplifting tag is entering the shopping area and determines whether to warn about a possible theft-related event. Other indicators contemplated in the processing are for instance vector magnitude, continuity of detection, duration of detection, change in electric field. All indicators can be weighed and combined to better estimate the risk that a theft might be about to take place, while reducing false alarms and erroneous detections, since the system discriminates between an
(Continued)

unlock magnet and other magnetic or metallic objects present in the entrance area.

20 Claims, 4 Drawing Sheets

(56) References Cited

FOREIGN PATENT DOCUMENTS

| | | | |
|---|---|---|---|
| EP | 0 072 552 | A2 | 8/1982 |
| EP | 1 416 300 | A2 | 5/2004 |
| WO | WO 2007/101317 | A2 | 9/2007 |
| WO | WO 2011/044915 | A1 | 4/2011 |

OTHER PUBLICATIONS

Search Report mailed Dec. 19, 2013 for Denmark Application No. PA 2013 70261 (1 pg.).

International Search Report mailed Sep. 11, 2014 in International Application No. PCT/EP2014/059769, English language (2 pp.).

THEFT-PREVENTING SYSTEM AND METHOD WITH MAGNETIC FIELD DETECTION

RELATED APPLICATIONS

This application claims the benefit under 35 U.S.C. §371 of International Patent Application No. PCT/EP2014/059769, having an international filing date of May 13, 2014, which claims priority to Danish Patent Application No. PA 201370261, filed May 14, 2013, the contents of all of which are incorporated herein by reference in their entirety.

Theft, also known as shoplifting, is a problem to many retailers—especially for those who sell those consumer goods such as clothes that are relatively easy to hide under a coat, in a handbag or the like.

Conventional systems, where the salespersons attach an electromagnetic tag to the goods, e.g. to the more expensive ones of the goods, are widely known. Antennas are placed near the entrance/exit(s) to/from the shop or shopping area and are coupled to an electric circuit that detects passing tags attached to goods. Normally the tags are removed when the goods are paid for at the cashier. So, when passage of a tag between the antennas is detected it is usually a theft-related event.

Despite the fact that such systems are widely installed, in almost every store e.g. those selling clothes or even those selling foodstuffs, theft is still a huge problem to the retailers.

SUMMARY

It is realized that people who intend to perform theft enter the shop or shopping area with a magnet configured to unlock the lock that attaches the above-mentioned tag to the goods. Then, in the shop, they remove the tag from the goods and leave the tag behind. They then take the goods out of the shop without raising any alarm from the conventional alarm systems.

An object of the claimed invention is to automatically detect when such a magnet enters the shop or shopping area.

However, such a magnet, e.g. an unlock magnet, is easily confused with other magnetic objects present and even moving about in and around a shopping area. A problem is then that automatic detection easily generates either false alarms or does not detect a magnet when it should. In this respect it should be noted that false alarms are seriously disliked by the sales personnel and the customers who risk getting erroneously accused of theft.

There is provided an electronic theft-preventing system, comprising: a first multi-axis magnetometer arranged in a first station and configured to output a first vector signal representing movement of a first magnetic field vector; a second multi-axis magnetometer arranged in a second station and configured to output a second vector signal representing movement of a second magnetic field vector; and a signal processor. The signal processor is coupled to receive the first and second vector signals, and configured to:

- estimate a first rotation of the first magnetic field vector and a second rotation of the second magnetic field vector;
- generate an indicator signal comprising indication of a counter-direction rotation or a same-direction rotation; and
- determine whether to issue or inhibit an alarm signal that warns about a possible theft-related event in response to at least the indicator signal.

Thereby, e.g. when the stations are located at each respective side of an entrance to a shopping area, the electronic theft-preventing system can give an indication of whether a magnetic object in the form of an unlock magnet for an anti-shoplifting tag moves into a shopping area. Shop personnel is then warned that there is a risk that theft is about to take place.

The multi-axis magnetometers can be e.g. of the magneto-resistive type. It may be an integrated unit of two- or three-axes type, or it may be in the form of one, two or three single-axis magnetometers. The vector signals output from the multi-axis magnetometers comprise a signal component from each axis either in analogue or digital form. A two-axis magnetometer gives a two-dimensional vector signal and a three-axis gives a three-dimensional vector signal. The signal components of a vector signal are output in parallel or in multiplexed form. Each signal component corresponds to a respective dimension of the vector signal.

The vector signal represents movement over time of a magnetic field vector and depends on the magnetic signal sensed by the magnetometer. The magnetic vector moves in a vector space and its rotation can be estimated (computed) with respect to its dimensions. There are various methods available in the field of vector mathematics to compute the rotation.

The same-direction rotation or counter-direction rotation may be represented by the indicator signal in a binary form or by a discrete or analogue value indicating an estimated degree of rotation. The indicator signal may also comprise an indication of the reliability of the estimated rotation.

In some embodiments the alarm signal is issued and/or inhibited in response to several indicator signals, whereof at least one is the above-mentioned indicator signal comprising indication of a counter-direction rotation or a same-direction rotation.

The term station generally designates any housing or platform suitable for installing the magnetometer in a shopping area. In case the housing encloses the magnetometer it should not magnetically shield the magnetometer at least in some directions. A suitable cover may be a plastics cover. The magnetometer may be installed on a platform of the station which may be of a magnetically shielding material.

In embodiments the signal processor is configured to:

- select a first and a second trace of the first and the second vector signal, respectively; and
- compute a projection of the first trace and the second trace to a common vector plane;

wherein the estimate of the first rotation and the second rotation is computed with respect to the common vector plane.

The trace is a portion or section of the vector signal. In case the vector signal is a digital signal, the trace is a sequence of samples for each dimension of the vector signal, i.e. a sequence of vector samples. The trace comprises a portion of the vector signal where the strength of the vector signal exceeds a threshold value. The strength may be estimated as the length of the vector (also denoted the norm of the vector).

The computation of the projection may start when the strength exceeds the threshold value or when the strength falls below the threshold again or when a predefined amount of vector samples with a strength exceeding the threshold has been received. Alternatively, the trace is selected as from a start point where a derivative computed from the vector signal exhibits certain behaviour e.g. where a first derivative has a local maximum. A first derivative may be computed as dS/dt, where dS is a change in strength, S, over the time interval dt. The end point may be computed in the same way. Thus the projection may be computed sample-by-sample as they arrive or on a multi-sample segment.

In some embodiments the projection of the first trace and the second trace to a common vector plane is achieved by arranging the magnetometers with their axes in parallel whereby a projection to a common plane reduces to selecting two vector components (i.e. two dimensions) at a time. Alternatively, a mathematical projection may be computed.

Projection to multiple differently oriented vector planes is possible by for each plane selecting two respective vector components. Thereby the indicator signal indicating a counter-direction rotation or a same-direction rotation can be computed from the projections to one or more of the common vector planes. This improves the likelihood of correctly estimating the rotation of the magnetic-field vector.

In embodiments the signal processor is further configured to:

- compute a difference between the first and the second vector;
- evaluate the difference to generate an indicator signal, indicating the distance to a magnetic object; and to
- include the indicator signal in determining whether or not to issue the alarm signal.

Thereby the reliability of the alarm signal can be improved. This is not an easy task since shopping areas may be located close to streets where cars, trucks, and other vehicles with unknown different magnetic properties may pass by or even park. When the difference or the norm of the difference is computed and compared to a threshold value and/or the first and/or second vector or the norm thereof it is possible to distinguish magnetic objects in the vicinity of the magnetometers from more distant objects. The difference is greatest when a magnetic object is located between the magnetometers and less when the magnetic object is located at greater distance.

In embodiments the signal processor is further configured to:

- generate a signal representing the strength of a magnetic field sensed by at least one of the magnetometers from the first and/or second vector values;
- estimate the duration of a time period during which a criterion on the strength of the magnetic field is satisfied;
- generate an indicator signal representing whether the duration of the time period belongs to a first distribution or a second distribution and/or a further distribution; and to
- include the indicator signal in determining whether or not to issue the alarm signal.

Thereby the reliability of the alarm signal can be improved. Although such a signal is not reliable in itself, it contributes to deciding whether or not to issue the alarm signal. The above is based on the observation that a shopping cart, which may appear as a magnet, in general takes longer time to pass between a set of magnetometers than e.g. an unlock magnet since both will pass within a speed range about a normal walking speed in a shopping area and since the shopping cart has a larger size and thus takes longer time to pass.

The duration can be computed in different ways e.g. as the period during which the magnetic strength exceeds a threshold or by detecting that the threshold is exceeded and then examining the strength at the lapse of a predetermined time period. Alternatively or in addition, it may be done by computing a derivative of the strength, e.g. a first derivative dS/dt and then examining the time lag from a first extreme value to the next.

In embodiments the rotation of a vector from one or more time instances to another one or more time instances is evaluated against a monotony criterion.

Thereby it is possible to detect whether the movement relates to an approaching object that also enters the gate between the stations or to an approaching, but not entering object, only passing by. Further it is possible to improve distinguishing between unlock magnets and at least some types of shopping carts. Thereby the reliability of the alarm signal can be improved.

The rotation can be computed e.g. from the so-called vector dot-product. The monotony criterion depends on the sample rate. For some sample rates the monotony criterion is a rotation of less then 90 degrees between two vector samples.

In embodiments:

- the first station comprises a transmitting antenna and an electronic transmitter being configured to transmit a radio frequency signal; and
- the second station comprises a receiving antenna and an electronic receiver being configured to receive the radio frequency signal;
- the system comprises a circuit configured to detect a predefined change in the radio frequency signal, caused by presence of an electromagnetically interfering object in a space between the location of the first and second station, and to output an indicator signal indicating whether there is a presence of such a metallic object, and
- the indicator signal is included to determine whether or not to issue the alarm signal.

The predefined change in the radio frequency signal may be an amplitude modulating change decreasing the amplitude by e.g. 0.1-2% or 0.1 to 5% due to the presence of a metallic object like a shopping cart or increasing the amplitude due to the presence of a plastics object, like a shopping cart made from plastics.

This indicator signal is thus generated in response to the signal sensed by the receiving antenna. In some embodiments a drop or decrease in the signal from the receiving antenna may contribute to or combine with other indicator signals to stimulate alarm generation—and—an increase or jump in amplitude of the signal from the receiving antenna may also or alternatively contribute to or combine with other indicator signals to stimulate alarm generation. This is expedient since it has been observed that shopping carts mainly made of metal causes a drop in amplitude whereas shopping carts made mainly of plastic or with a plastic basket causes a jump in amplitude.

There is also provided a computer-implemented method of detecting a theft-related event, comprising:

- acquiring first vector values representing movement of a first magnetic field vector by means of a first multi-axis magnetometer arranged in a first station;
- acquiring second vector values representing movement of a second magnetic field vector by means of a second multi-axis magnetometer arranged in a second station;
- estimating a first rotation of the first vector and a second rotation of the second vector;
- generating an indicator signal comprising indication of a counter-direction rotation or a same-direction rotation;
- determining whether to issue or inhibit an alarm signal that warns about a possible theft-related event in response to at least the indicator signal.

In embodiments the method comprises:

selecting a first and a second trace of the first and the second vector signal, respectively; and computing a projection of the first trace and the second trace to a common vector plane;

wherein the estimate of the first rotation and the second rotation is computed with respect to the common vector plane.

In embodiments the method comprises:

computing a difference between the first and the second vector;

evaluating the difference to the first and/or second vector to generate an indicator signal, indicating the distance to a magnetic object; and including the indicator signal in determining whether or not to issue the alarm signal.

In embodiments the method comprises:

generating a signal representing the strength of a magnetic field sensed by at least one of the magnetometers from the first and/or second vector values;

estimating the duration of a time period during which a criterion on the strength of the magnetic field is satisfied;

generating an indicator signal representing whether the duration of the time period belongs to a first distribution or a second distribution and/or a further distribution; and including the indicator signal in determining whether or not to issue the alarm signal.

In embodiments the rotation of a vector from one value to another is evaluated against a monotony criterion.

In embodiments the method comprises that:

the first station comprises a transmitting antenna and an electronic transmitter being configured to transmit a radio frequency signal; and the second station comprises a receiving antenna and an electronic receiver being configured to receive the radio frequency signal;

the system comprises a circuit configured to detect a predefined change in the radio frequency signal, caused by presence of a metallic object in a space between the location of the first and second station, and to output an indicator signal indicating whether there is a presence of such a metallic object, and the indicator signal is included to determine whether or not to issue the alarm signal.

There is also provided a data processing system having stored thereon program code means adapted to cause the data processing system to perform the steps of the above method, when said program codes means are executed on the data processing system.

There is also provided a computer program product comprising program code means adapted to cause a data processing system to perform the steps of the above method, when said program code means are executed on the data processing system.

BRIEF DESCRIPTION OF THE FIGURES

A more detailed description follows below with reference to the drawing, in which.

DETAILED DESCRIPTION

Figure 1:
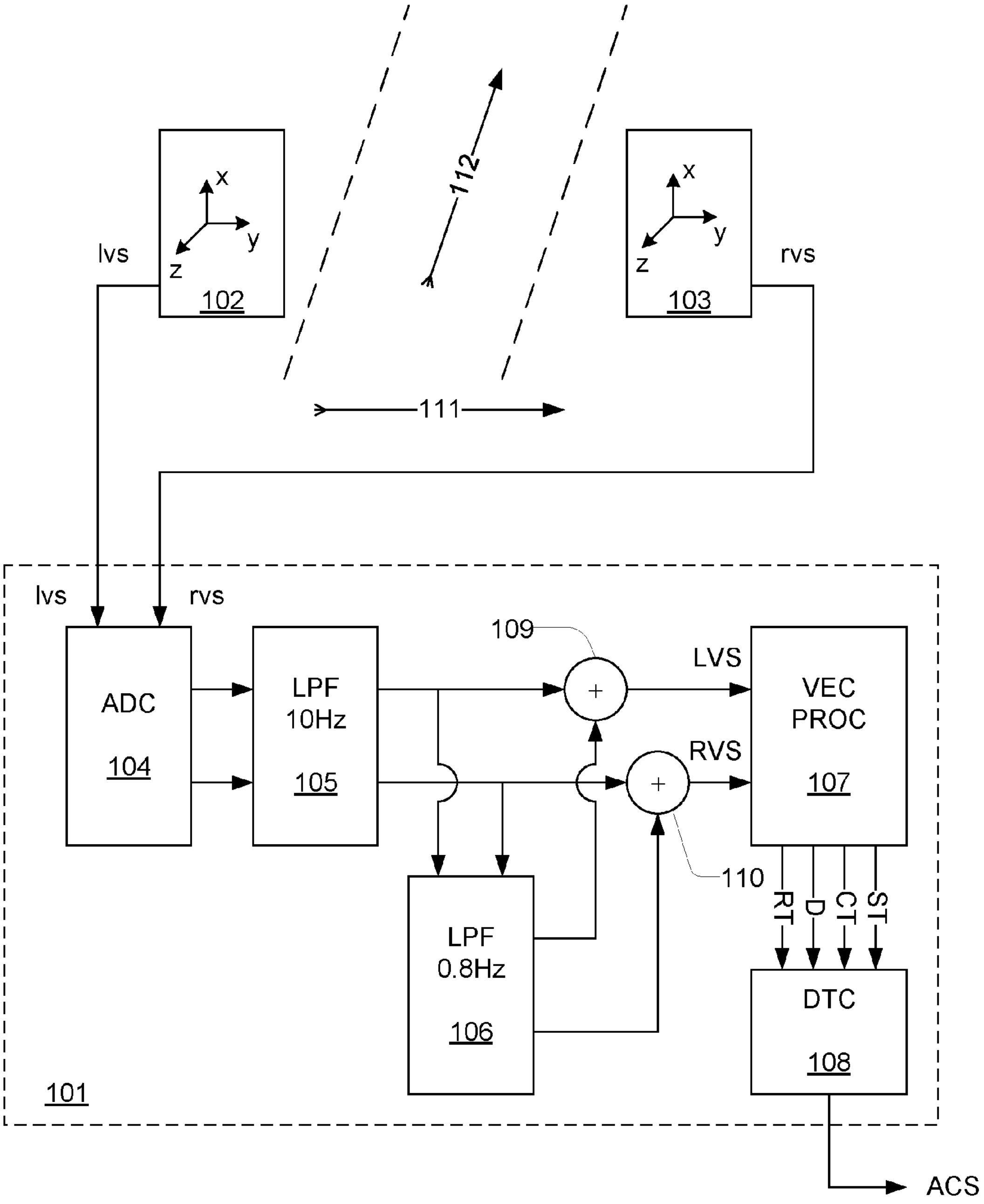
FIG. 1 shows a block diagram of a theft-preventing system with magnetometers.

FIG. 1 shows a block diagram of a theft-preventing system with magnetometers. The magnetometers are shown as three-axes magnetometers and are designated by reference numerals 102 and 103 and output respective signals lvs and rvs. The axes are designated x, y and z. In this embodiment the magnetometers are of the magneto-resistive type and output the signals lvs and rvs in analogue form. However, the magnetometers may be of other types as well. Each of the magnetometers outputs a signal with three dimensions e.g. as three parallel analogue signals. Such a signal is denoted a vector signal; it has a signal component for each dimension. The vector signal from a magnetometer represents the magnetic field sensed by the magnetometer. Conventional magnetometers may be arranged in a package with an indication of the orientation of the axes along which the magnetic field is sensed. Preferably the magnetometers 102 and 103 are arranged with their axes in parallel or substantially in parallel. Thereby signals from parallel axes of the respective magnetometers can more easily be compared and/or processed together.

In alternative embodiments the signals are output from the magnetometer as three multiplexed or parallel digital signals. The magnetometers may each have only two axes or more than three axes or one of them may have two axes whereas the other one has three axes.

The magnetometers are arranged in a respective station located at each side, left and right, of an entrance way (illustrated by dashed lines) to a shopping area.

A direction into the shopping area and of passing between the respective stations is shown by arrow 112. A direction of passing by is shown by arrow 111. Thus a person entering the shopping area will follow direction 112, whereas a person passing by on a walking area e.g. on a pavement in front of the shopping area will follow direction 111.

Only two stations and a single entrance way are shown; however, in embodiments more than two stations are arranged to cover a broad entrance or to cover multiple entrance ways. Thus for each entrance there is at least a station arranged on the left and right sides of an entrance. In some embodiments, a station hosts one multi-axis magnetometer, whereas in others a station hosts both a left and a right multi-axis magnetometer for a respective entrance way. In some embodiments a single multi-axis magnetometer serves both as a left and a right magnetometer. In some embodiments, when an alarm is issued, as described further below, it is issued with a visual designation or indication of the passage, among multiple passages or entrance ways, whereat an alarm-triggering event occurred, e.g. by displaying a number on a display.

The term station generally designates any housing or platform suitable for installing the magnetometer in a shopping area.

As will be described in the below, the signals lvs and rvs (left and right vector signals) are processed as a pair of vector signals. In case more than two magnetometers are used, e.g. to cover multiple passages or entrance ways, multiple signal processors for such pair wise signals may be used or a signal processor may be configured for processing more than two signals.

Such a signal processor is designated 101 and it receives the signals lvs and rvs which are input to an analogue-to-digital converter, ADC, 104. The ADC may sample the signals at a relatively high sample rate e.g. 8 KHz which is decimated to a lower sample rate (not shown) as it is known in the art. Resulting digital signals are input to a low-pass filter, LPF, 105 with a cut-off frequency about 10 Hz. The cut-off frequency may be as low as about 4, 5 or 6 Hz and as high as 15, 20, 30 or 40 Hz. The output of the low-pass filter 105 is fed to the input of low-pass filter, 106 and in parallel therewith to respective adders 109 and 110 which subtracts the output from LPF, 106, from the output from LPF, 105.

LPF, 106 has a cut-off frequency about 0.8 Hz, but it can be lower—say about 0.4 or 0.6 Hz, and higher—say about 1.0 or 1.6 Hz. LPF, 106, is configured to remove or diminish a substantially stationary portion of the vector signal attributed to the earth's magnetic field as sensed by the magnetometers. LPF 105 and LPF 106 implement in combination a band-pass filter configured to suppress signal portions considered to move too fast or too slow to originate from movement in proximity of the magnetometers of magnets that could be used for theft-related activities. Thus, a band-pass implementation could be used as well.

The signals output from the adders 109 and 110 are designated LVS and RVS, respectively. LVS and RVS are input to a vector processor, VEC PROC, 107. Thus the signals lvs and rvs are processed into to signals LVS and RVS, respectively. This processing can be considered a pre-processing and is performed for six signal components when two three-axis magnetometers are used. Due to the relatively low sample rate, a general purpose signal processor is in general sufficiently fast to allow multiplexed or concurrent signal processing of the signal components.

The vector processor performs the operations described in more detail below in connection with the flowchart. The vector processor, 107, outputs one or more indicator signals, RT and ST and/or CT and/or D, providing measures of magnetic field or electromagnetic field properties in proximity of the magnetometers. These measures are considered to correlate with theft-related events or non-theft related events, where the former can be used to stimulate issue of an alarm signal and where the latter can be used to inhibit issue of an alarm.

A detector, DTC, 108, receives one or more of the signals RT and ST and/or CT and/or D and determines whether to issue an alarm signal or not. This is also described in more detail in the below.

Figure 2:
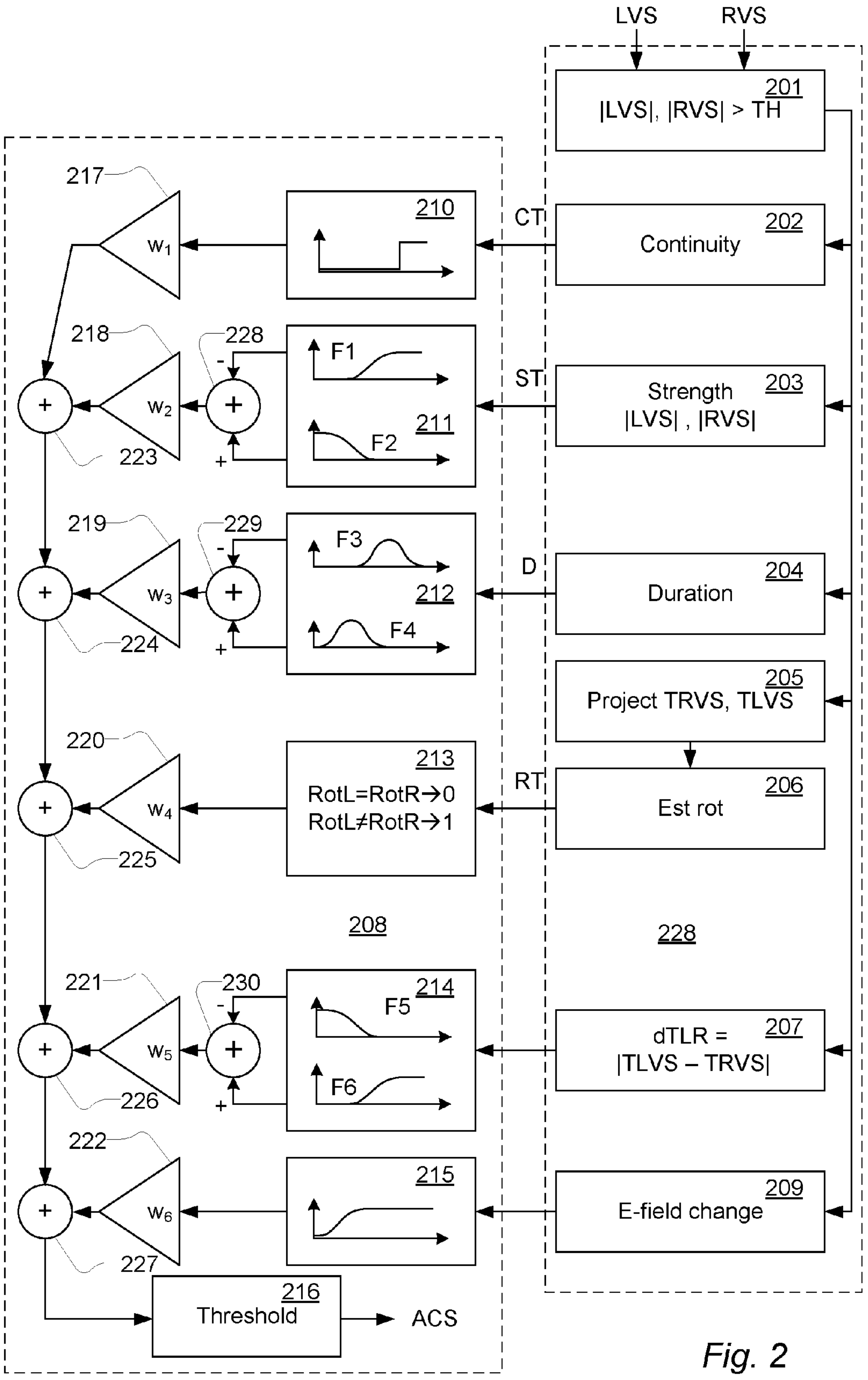
FIG. 2 shows a flowchart for processing vector signals from magnetometers.

FIG. 2 shows a flowchart for processing vector signals from magnetometers. The vector signal LVS and RVS are input to a first portion of the flowchart 228, which in some embodiments is performed by the vector signal processor 107. Another portion of the flowchart 208 is in some embodiments performed by the detector 108. However, other implementations can be used. In general 228 (107) and 208 (108) can be implemented by a single signal processor unit (e.g. in the form of a so-called integrated circuit signal processor).

In step 201 the signals LVS and RVS are received sample-by-sample and the length |LVS| and |RVS| of the vector represented by the signal is computed. In case the length of one and/or both of them exceed(s) a threshold value TH, processing may continue to the next step 202 and a so-called trace of vectors is started as a sequence of vectors. The trace ends when |LVS| and/or |RVS| fall(s) below the threshold again. Processing may alternatively continue when a predefined number of samples exceeding the threshold are received or when a complete trace is recorded.

In the following step 202 continuity of the sequence of vectors is computed. A measure of continuity is computed to identify whether the vector rotates monotonically in the same direction over two or more samples. The measure of continuity can e.g. be computed as the so-called dot-product of any two consecutive vectors of the same signal LVS or RVS. The measure is computed over a number of samples e.g. from a first to a next sample of from a first group of samples to a next group.

The number of samples over which continuity is found to be present is output as indicator signal CT. CT is then input to evaluation in step 210 which implements a mapping function. Below a predefined number of samples continuity is not present and a value of '0' is output, whereas above a predefined number of samples, continuity is present and a value of '1' is output. This mapping function is illustrated by the coordinate system in box 210, where the number of samples is represented along the abscissa axis and output values along the ordinate axis. Consequently, persistent continuity over more than a predefined number of samples is given a larger value than lack of or interruption of such continuity. This is reflected in the output, which is also designated an indicator signal, by step 210.

Output of step 210 is summed in a weighted manner by means of adders and weights, such as adder 223 and weight, w1, 217. The total sum computed by the adders 223, 224, 225, 226 and 227 is input to a threshold detector 216 which outputs an alarm control signal, ACS, if the total sum exceeds a predefined threshold. The alarm control signal may be coupled to an alarm unit giving an audio and/or visual alarm signal. The alarm control signal may also be recorded in a log e.g. in a database for subsequent inspection.

The output provided by steps 202, 210 and 217 in respect of continuity gives a contribution to ACS indicating whether a magnetic object passed between the magnetometers or passed only halfway and then returned again. Computation of continuity may be aborted at the instant when non-continuity is detected or a predefined number of samples thereafter. Computation of continuity may be resumed at any time including the instant when non-continuity is detected.

The strength of LVS and RVS is also provided as indicator signal ST, which may be computed or recalled in step 203, cf. the computation in step 201 above. The indicator signal ST is input to step 211 which also computes a mapping function with a value or values of ST as its input. This mapping function is illustrated by two coordinate systems F1 and F2 at the top and bottom of box 211. A large value of strength from ST gives a relatively large value from F1, whereas F2 outputs a lower value e.g. just above '0'. By means of adder 228 output from F1 is subtracted and output from F2 is added. The result of the addition performed by adder 228 is a value input to weight, w2, 218, and then input to adder 223. This value contributes to ACS as described above. Other ways of implementing the mapping function or an alternative mapping function are conceivable using conventional signal processing techniques.

The output provided by steps 203, 211, 228 and 218 in respect of strength gives a contribution to ACS indicating the strength of the object and may be used to distinguish e.g. unlock magnets from shopping carts of metal, where shopping carts of metal in general exhibits a stronger magnetic field around the cart. Therefore a large ST value drives the input to the threshold detector 216 to a smaller value to inhibit issue of an alarm. Vice versa: a weaker signal, but still above threshold TH (cf. step 201), drives the input to the threshold detector 216 to a greater value.

Further, a duration of the vector signal(s) during which it/they exhibit(s) a sufficient strength is estimated and used as an indicator signal, D. The duration may be estimated from a start point when the signal strength exceeds a threshold level to an end point when the signal strength falls below the threshold level or another threshold level. Alternatively, the duration can be estimated as the time lag between two extreme values of a first or further derivative of the vector signal(s).

The indicator signal D is input to step 212 which also computes a mapping function with a value or values of D as its input. This mapping function is illustrated in two coordinate systems F3 and F4 at the top and bottom of box 212. A lower value of D gives a large value from F3 e.g. close to '1', whereas F4 outputs a lower value e.g. just above '0'. By means of adder 229 output from F3 is subtracted and output from F4 is added. The result of the addition performed by adder 229 is a value input to weight, w3, 219, and then input to adder 224. This value contributes to ACS as described above.

Thus, only if the value of duration is about a predefined, shorter duration, i.e. not too low or too high, the duration measure will drive issue of an alarm signal. If the duration is about a predefined, longer duration, the mapping function F3 results in a positive value e.g. '1' that is subtracted by adder 220 and thus drives the input to the threshold detector 216 to a smaller value to inhibit issue of an alarm. This may be the case when a shopping cart is present.

An estimate of the rotation of the vector signals computed and used as an indicator signal, RT. As mentioned above a trace of the vector signals LVS and RVS are acquired. The traces are denoted TLVS and TRVS, respectively. The traces comprise a respective sequence of samples of LVS and RVS, where the strength of a vector sample (e.g. defined by its length) exceeds a threshold value (cf. step 201). In step 205 the traces are projected to a common two-dimensional plane. In the case where the magnetometers are aligned mutually with their axes in parallel or substantially in parallel, the projection reduces to using only two of the three dimensions of a vector sample. In preferred embodiments the traces are projected this way to three orthogonal planes. In step 206 the rotation of the magnetic field vectors, as defined by the traces, are estimated in each plane. So for each plane two projections are made, one for each trace TLVS and TRVS. A method of estimating the rotation is given further below in connection with acquired traces.

As an alternative to projecting the traces to different planes which reduces the rotation estimation to one or more 2-dimensional estimations, 3-dimensional estimation methods or other estimation methods can be applied as well e.g. comprising estimating first a 2-dimensional plane in which or substantially in which a magnetic vector rotates and then estimating rotation in the estimated 2-dimensional plane.

Output from step 206 is a signal RT representing the rotation or rotations. In step 213 RT is converted into a binary signal with the value '0' if the rotation of TLVS and TRVS is in the same direction; and '1' if the rotation of TLVS and TRVS is a counter-direction rotation. However, other ways of encoding one or more output signals, RT, are conceivable. Thus, if a counter-direction situation occurs, e.g. if a magnet passes between the two magnetometers, a value '1' is output from step 213 to weight, w4, 220, which in turn outputs the weighted value to adder 225. This in turn drives the input to the threshold detector 216 to a greater value to stimulate issue of an alarm.

Step 207 computes the length, dTLR, of the difference vector between TLVS and TRVS at sample instances.

The signal dTLR is also an indicator signal and is input to step 214 which computes a mapping function with a value or values of dTLR as its input.

This mapping function is illustrated in two coordinate systems F5 and F6 at the top and bottom of box 214. A lower value of dTLR gives a large value from F5 e.g. close to '1', whereas F6 outputs a lower value e.g. just above '0'. By means of adder 230, output from F5 is subtracted and output from F6 is added. The result of the addition performed by adder 230 is a value input to weight, w5, 221, and then input to adder 226. This value contributes to ACS as described above. More particularly in the way that, when a TLVS vector and a TRVS vector are substantially the same (substantially same direction and substantially same length), dTLR is short, the value of F5 dominates and, due to the subtraction performed by adder 230, an alarm signal is inhibited. This event can occur when the sensed magnetic field is dominated by a strong, but relatively remote object which should trigger an alarm. Conversely, different directions of a vector in TLVS and a vector in TRVS indicate a proximate object which should trigger an alarm. Whether an alarm is triggered depends on the value(s) of the other indicator signals as described above.

Further, in step 209 a change in an electric field is measured. The hardware for measuring such a change is described further below. The output from step 209 is an indicator signal with the absolute value of a change in the strength of a magnetic field. Thus a drop or an increase in the amplitude of a magnetic field is represented by a larger value. The mapping function performed in step 215 gives a value close to '0' if there is no change and a value close to '1' if there is a change. Step 215 outputs a value to weight, w6, 222, according to its mapping function. The output from weight w6, 222, is then fed to adder 227 to stimulate or inhibit issue of an alarm.

In general, other ways of implementing the mapping function(s) are conceivable using conventional signal processing techniques. The functions chosen for the mapping functions may be selected to suit implementation aspects, the computation of the measures, different numerical ranges etc. The weights and the mapping functions may also be tuned.

FIGS. 3*a*, 3*b*, 3*c* and 3*d* depict strength and projections of vector traces.

Figure 3A:
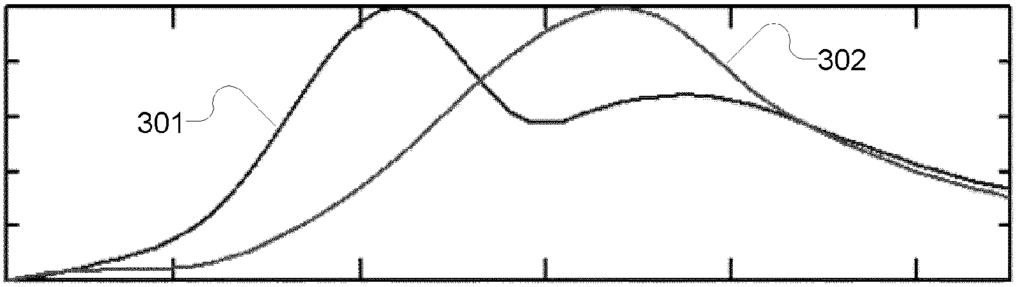
FIGS. 3*a*, 3*b*, 3*c*, and 3*d* depict strength and projections of vector traces.

FIG. 3*a* shows a plot of the strength of vectors, 301, in TLVS and vectors, 302, TRVS. The plots are given in a coordinate system with time along the abscissa (x-axis) and strength along the ordinate (y-axis).

Figure 3B:
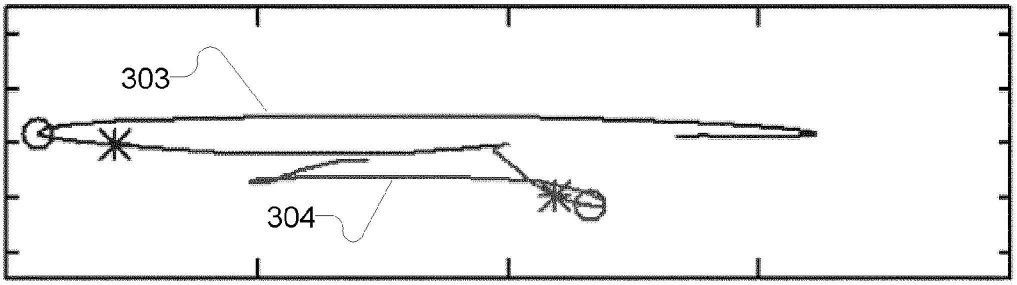

FIG. 3*b* shows projections 303 and 304 of TLVS and TRVS to a first plane (XY-plane) spanned by the abscissa and the ordinate.

Figure 3C:
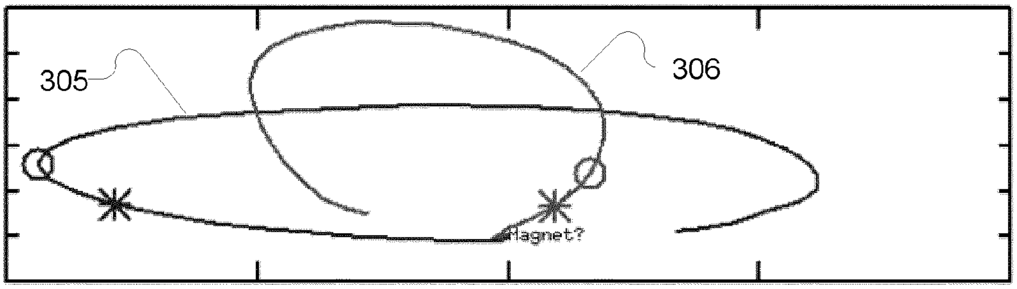

FIG. 3*c* shows projections 305 and 306 of TLVS and TRVS to a second plane (XZ-plane) spanned by the abscissa and the ordinate.

Figure 3D:
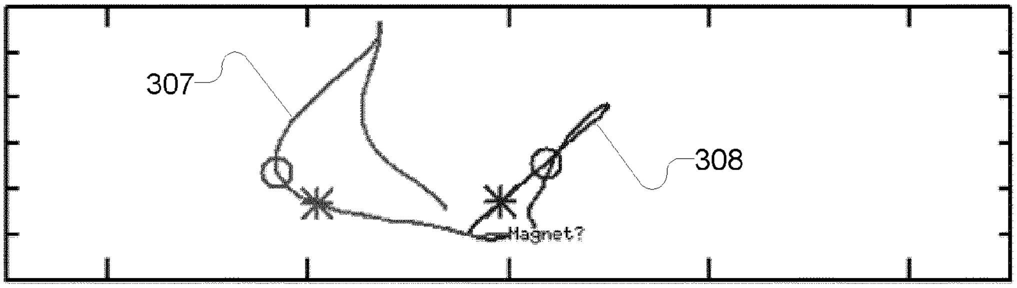

FIG. 3*d* shows projections 307 and 308 of TLVS and TRVS to a second plane (ZY-plane) spanned by the abscissa and the ordinate.

The uneven reference numerals belong to TLVS and the even-numbered to TFVS.

A method for estimating rotation computes a so-called 'opening' for the projection of a trace. The opening of a trace is defined as the ratio between the extent of the trace along the abscissa and the extent of the trace along the ordinate. Opening values above or below a threshold result in the projection being discarded for the purpose of estimating rotation. Non-discarded projections are investigated to examine whether the vector moves in a clock-wise or counter-clock-wise direction. This can be inferred since the temporal order of the vector samples is known. The X-symbol indicates a vector earlier in time and the O-symbol indicates a vector later in time.

Thus, the method can infer:

- from FIG. 3*b* that for trace 303 and 304 the opening is too small or too large and that the traces are discarded from estimating rotation;
- from FIG. 3*c* that for trace 305 and 306 the opening is within a predefined range and that traces are not discarded from estimating rotation; they can be used for estimating rotation. Further, trace 305 is for a vector rotating clock-wise, and trace 306 is for a vector rotating counter-clock-wise. A magnet could be passing between the magnetometers.
- from FIG. 3*d* that for trace 307 and 308 the opening is within a predefined range and that traces are not discarded from estimating rotation; they can be used for estimating rotation. Further, trace 307 is for a vector rotating clock-wise, and trace 308 is for a vector rotating counter-clock-wise (difficult to see from the figure). A magnet could be passing between the magnetometers.

Thus, the method can output an indicator signal that a counter-direction rotation is estimated. The method could output indicator values in an alternative way as long as a same-direction or counter-direction rotation can be inferred; discrete or binary values may be output.

Figure 4:
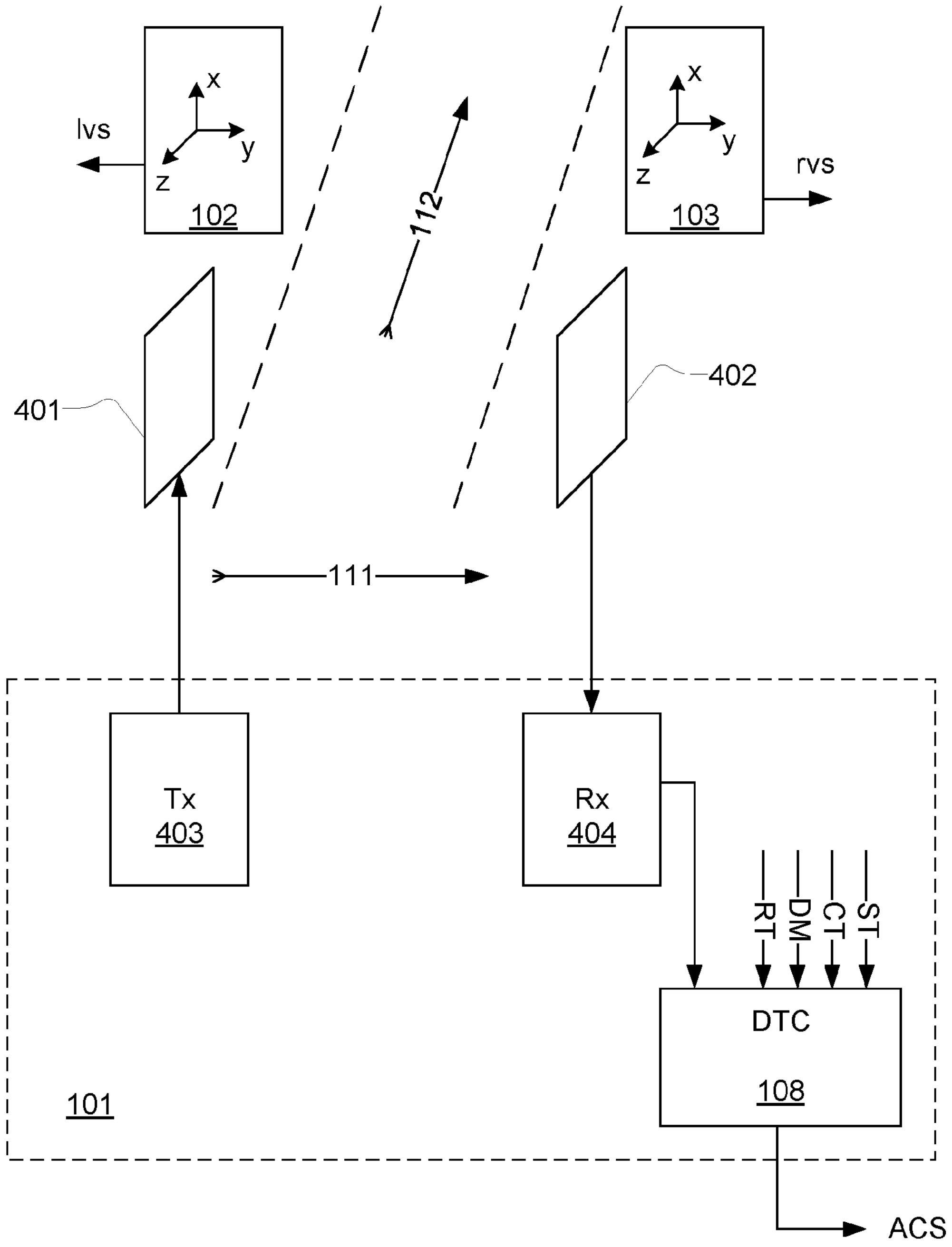
FIG. 4 shows a block diagram of a component for electric field sensing for the theft-preventing system.

FIG. 4 shows a block diagram of a component for electric field sensing for the theft-preventing system. The electric field sensing is known in the art. Here, electric field sensing can be used as described above in connection with the flowchart to enhance inhibiting or stimulating issue of an alarm. Especially electric field sensing can be used to inhibit false alarms.

A theft-preventing system with electric field sensing comprises a transmitting antenna 401 and a receiving antenna 402. The transmitting antenna 401 radiates an electromagnetic signal e.g. at a frequency of about 20-40 KHz, typically 17-30 KHz, with a constant, predefined amplitude and is driven by a transmitter 403. The receiving antenna 402 is coupled to a receiver 404 which is configured to output an indicator signal representing a change in the strength in the electromagnetic signal as received by the antenna. The change may be a drop in strength or an increase in strength. A change even as small as 1-2 percent of the predefined strength or amplitude may be detected and represented in the indicator signal.

The invention claimed is:

1. An electronic theft-preventing system, comprising:

a first multi-axis magnetometer arranged in a first station and configured to output a first vector signal representing movement of a first magnetic field vector;

a second multi-axis magnetometer arranged in a second station and configured to output a second vector signal representing movement of a second magnetic field vector;

a signal processor coupled to the first and second magnetometers to receive the first and second vector signals, and configured to:

estimate a first rotation of the first magnetic field vector and a second rotation of the second magnetic field vector;

generate an indicator signal comprising indication of a counter-direction rotation or a same-direction rotation;

determine whether to issue or inhibit an alarm signal that warns about a possible theft-related event in response to at least the indicator signal.

2. An electronic theft-preventing system, according to claim 1, wherein the signal processor is further configured to:

select a first and a second trace of the first and the second vector signal, respectively; and compute a projection of the first trace and the second trace to a common vector plane;

wherein the estimate of the first rotation and the second rotation is computed with respect to the common vector plane.

3. An electronic theft-preventing system, according to claim 1, wherein the signal processor is further configured to:

compute a difference between the first and the second vector;

evaluate the difference to generate an indicator signal, indicating the distance to a magnetic object; and to include the indicator signal in determining whether or not to issue the alarm signal.

4. An electronic theft-preventing system, according to claim 1, wherein the signal processor is further configured to:

generate a signal representing the strength of a magnetic field sensed by at least one of the magnetometers from the first and/or second vector values;

estimate the duration of a time period during which a criterion on the strength of the magnetic field is satisfied;

generate an indicator signal representing whether the duration of the time period belongs to a first distribution or a second distribution and/or a further distribution; and to include the indicator signal in determining whether or not to issue the alarm signal.

5. An electronic theft-preventing system, according to claim 1, wherein the rotation of a vector from one or more time instances to another one or more time instances is evaluated against a monotony criterion.

6. An electronic theft-preventing system, according to claim 1, wherein:

the first station comprises a transmitting antenna and an electronic transmitter being configured to transmit a radio frequency signal;

the second station comprises a receiving antenna and an electronic receiver being configured to receive the radio frequency signal; and the system comprises a circuit configured to detect a predefined change in the radio frequency signal, caused by presence of an electromagnetically interfering object in a space between the location of the first and second station, and to output an indicator signal indicating whether there is a presence of such a metallic object, and the indicator signal is included to determine whether or not to issue the alarm signal.

7. A computer-implemented method of detecting a theft-related event, comprising:

acquiring first vector values representing movement of a first magnetic field vector by means of a first multi-axis magnetometer arranged in a first station;

acquiring second vector values representing movement of a second magnetic field vector by means of a second multi-axis magnetometer arranged in a second station;

estimating a first rotation of the first vector and a second rotation of the second vector;

generating an indicator signal comprising indication of a counter-direction rotation or a same-direction rotation; and determining whether to issue or inhibit an alarm signal that warns about a possible theft-related event in response to at least the indicator signal.

8. A computer-implemented method, according to claim 7, further comprising:

selecting a first and a second trace of the first and the second vector signal, respectively; and computing a projection of the first trace and the second trace to a common vector plane;

wherein the estimate of the first rotation and the second rotation is computed with respect to the common vector plane.

9. A computer-implemented method, according to claim 7, further comprising:

computing a difference between the first and the second vector;

evaluating the difference to the first and/or second vector to generate an indicator signal, indicating the distance to a magnetic object; and including the indicator signal in determining whether or not to issue the alarm signal.

10. A computer-implemented method, according to claim 7, further comprising:

generating a signal representing the strength of a magnetic field sensed by at least one of the magnetometers from the first and/or second vector values;

estimating the duration of a time period during which a criterion on the strength of the magnetic field is satisfied;

generating an indicator signal representing whether the duration of the time period belongs to a first distribution or a second distribution and/or a further distribution; and including the indicator signal in determining whether or not to issue the alarm signal.

11. A computer-implemented method, according to claim 7, wherein the rotation of a vector from one value to another is evaluated against a monotony criterion.

12. A computer-implemented method, according to claim 7, wherein:

the first station comprises a transmitting antenna and an electronic transmitter being configured to transmit a radio frequency signal;

the second station comprises a receiving antenna and an electronic receiver being configured to receive the radio frequency signal; and the system comprises a circuit configured to detect a predefined change in the radio frequency signal, caused by presence of a metallic object in a space between the location of the first and second station, and to output an indicator signal indicating whether there is a presence of such a metallic object, and the indicator signal is included to determine whether or not to issue the alarm signal.

13. A data processing system having stored thereon program code means adapted to cause the data processing system to perform the steps of the method according to claim 7, when said program codes means are executed on the data processing system.

14. A computer program product comprising program code means adapted to cause a data processing system to perform the steps of the method according to claim 7, when said program code means are executed on the data processing system.

15. An electronic theft-preventing system, according to claim 2, wherein the signal processor is further configured to:

compute a difference between the first and the second vector;

evaluate the difference to generate an indicator signal, indicating the distance to a magnetic object; and to include the indicator signal in determining whether or not to issue the alarm signal.

16. An electronic theft-preventing system, according to claim 2, wherein the signal processor is further configured to:

generate a signal representing the strength of a magnetic field sensed by at least one of the magnetometers from the first and/or second vector values;

estimate the duration of a time period during which a criterion on the strength of the magnetic field is satisfied;

generate an indicator signal representing whether the duration of the time period belongs to a first distribution or a second distribution and/or a further distribution; and to include the indicator signal in determining whether or not to issue the alarm signal.

17. An electronic theft-preventing system, according to claim 2, wherein the rotation of a vector from one or more time instances to another one or more time instances is evaluated against a monotony criterion.

18. A computer-implemented method, according to claim 8, further comprising:

computing a difference between the first and the second vector;

evaluating the difference to the first and/or second vector to generate an indicator signal, indicating the distance to a magnetic object; and including the indicator signal in determining whether or not to issue the alarm signal.

19. A computer-implemented method, according to claim 8, further comprising:

generating a signal representing the strength of a magnetic field sensed by at least one of the magnetometers from the first and/or second vector values;

estimating the duration of a time period during which a criterion on the strength of the magnetic field is satisfied;

generating an indicator signal representing whether the duration of the time period belongs to a first distribution or a second distribution and/or a further distribution; and including the indicator signal in determining whether or not to issue the alarm signal.

20. A computer-implemented method, according to claim 8, wherein the rotation of a vector from one value to another is evaluated against a monotony criterion.

* * * * *